United States Patent [19]

Koakutsu et al.

[11] Patent Number: 4,756,593
[45] Date of Patent: Jul. 12, 1988

[54] CONNECTOR COMPRISING A PLUG HAVING A BUILT-IN OPTOELECTRONIC CONVERSION MEANS AND A SOCKET

[75] Inventors: Yasumasa Koakutsu, Fujisawa; Seiichi Onoda, Tokorozawa; Masao Yano, Yokohama; Junichi Shimizu, Tokyo; Sadahiro Ohyama, Chigasaki; Noriaki Sekine, Atsugi; Noribumi Ishi, Juo; Jiro Nakano; Hideji Matsuura, both of Atsugi; Yasusi Anzo, Mito, all of Japan

[73] Assignees: Hitachi, Ltd.; Mitsumi Electric Co., Ltd., both of Tokyo, Japan

[21] Appl. No.: 938,589

[22] Filed: Dec. 5, 1986

[30] Foreign Application Priority Data

| Dec. 11, 1985 | [JP] | Japan | 60-190902[U] |
| Dec. 11, 1985 | [JP] | Japan | 60-190903[U] |
| Dec. 11, 1985 | [JP] | Japan | 60-190904[U] |
| Dec. 11, 1985 | [JP] | Japan | 60-190905[U] |
| Dec. 11, 1985 | [JP] | Japan | 60-190906[U] |
| Dec. 11, 1985 | [JP] | Japan | 60-190907[U] |

[51] Int. Cl.$^4$ .............................. G02B 6/42
[52] U.S. Cl. ......................... 350/96.20; 350/96.15; 250/227; 439/101; 439/680; 439/818
[58] Field of Search ............... 350/96.15, 96.20, 96.21; 339/14 L, 14 P, 143, 253 R, 254, 186; 250/227, 552

[56] References Cited

U.S. PATENT DOCUMENTS

| 4,118,690 | 10/1978 | Paynton | 339/14 P X |
| 4,279,465 | 7/1981 | Vojvodich | 350/96.20 |
| 4,493,525 | 1/1985 | Hall et al. | 339/143 R |
| 4,595,839 | 6/1986 | Braun et al. | 350/96.20 X |

FOREIGN PATENT DOCUMENTS 0156075  10/1985  European Pat. Off. ......... 350/96.21

Primary Examiner—John Lee
Assistant Examiner—Michael Menz
Attorney, Agent, or Firm—Ladas & Parry

[57] ABSTRACT

A connector comprises a plug and a socket. The plug has a main plug body, a plurality of contact pins projecting from the main plug body and including a contact pin for grounding, and a shielding member surrounding the plurality of contact pins. The socket has a main socket body, a plug receiving part provided on the main socket body for receiving the shielding member, a plurality of contact portions provided within the plug receiving part for making contact with corresponding ones of the plurality of contact pins and including a first contact portion for making contact with the contact pin for grounding, and a second contact portion provided on the main socket body for making contact with the shielding member. The plug is detachably coupled to the socket by inserting the shielding member into the plug receiving part. The first and second contact portions are made of a single contact member.

5 Claims, 5 Drawing Sheets

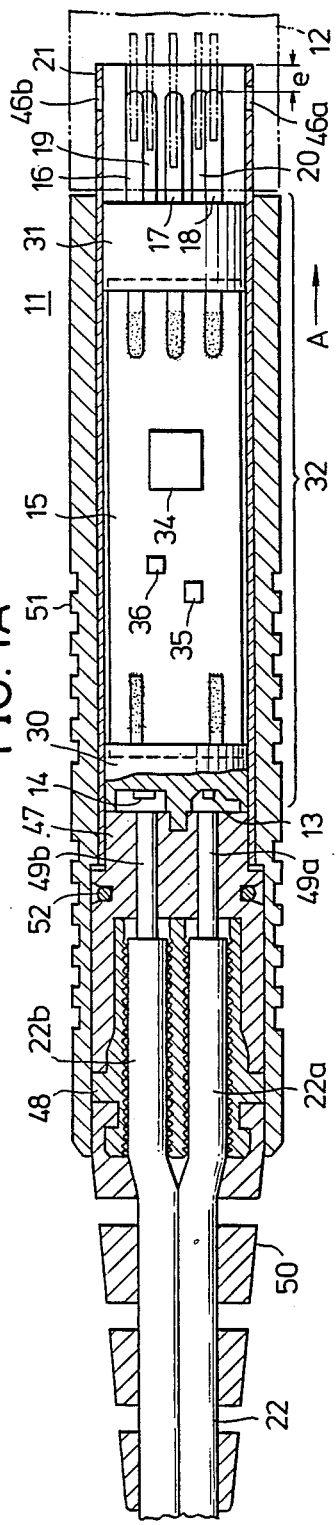
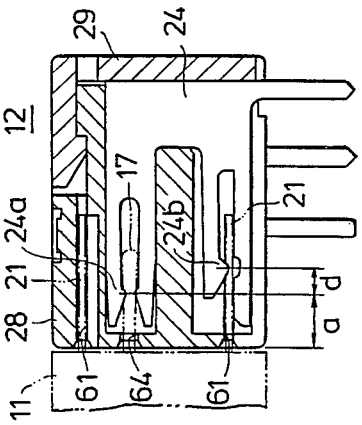
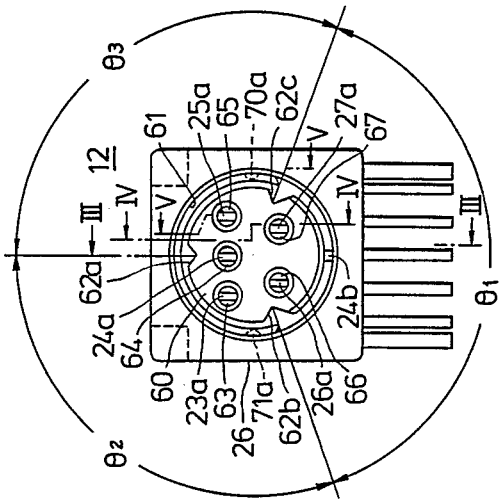
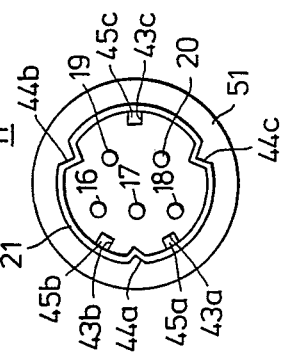

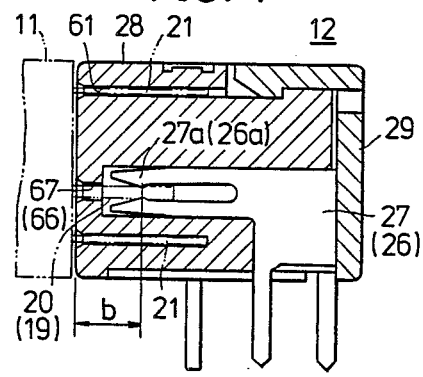
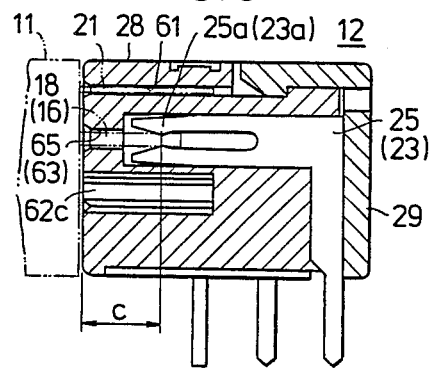
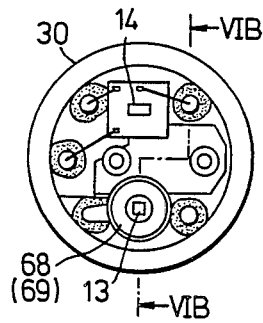
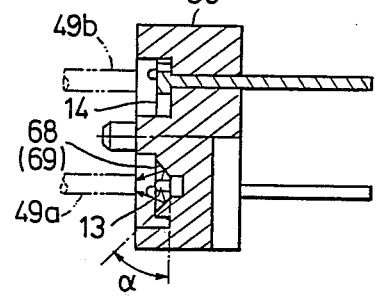
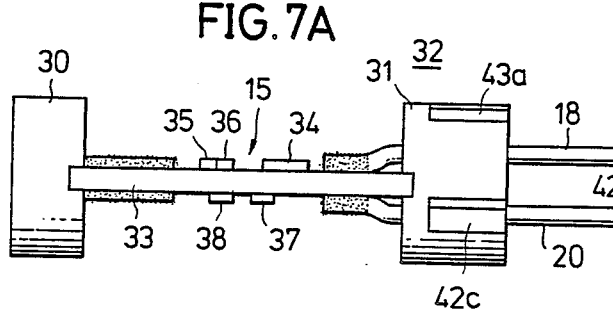
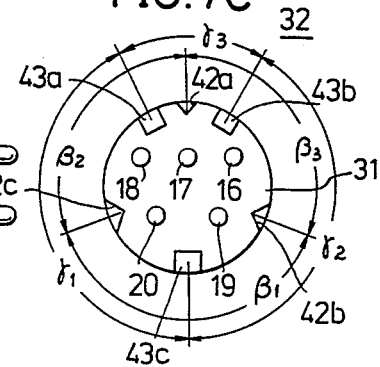

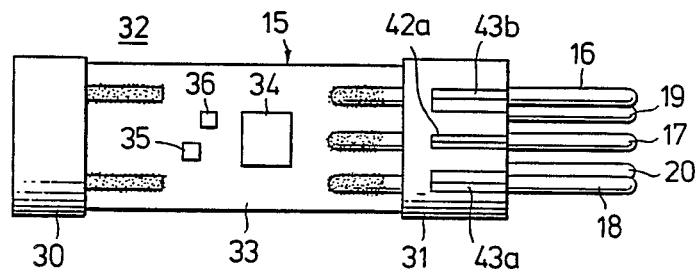
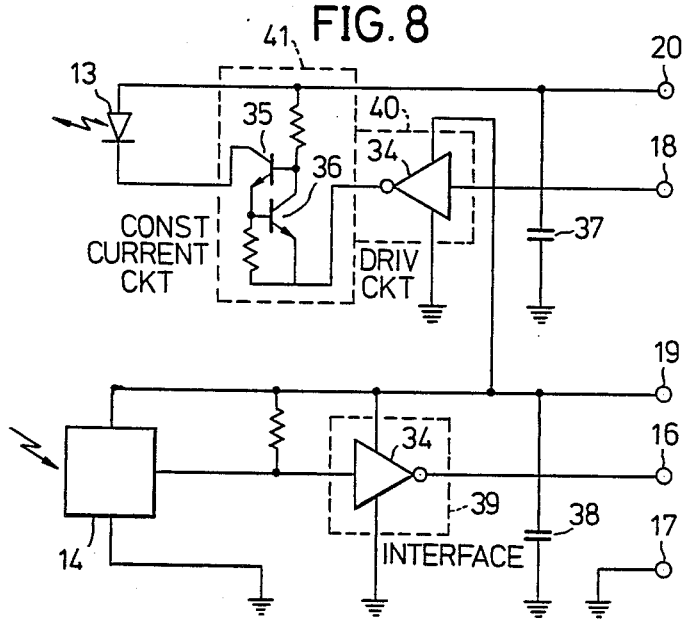
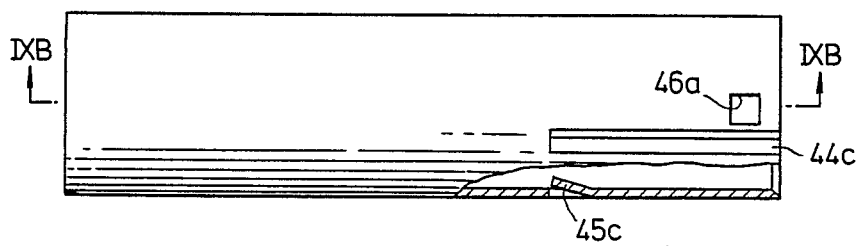

CONNECTOR COMPRISING A PLUG HAVING A BUILT-IN OPTOELECTRONIC CONVERSION MEANS AND A SOCKET

BACKGROUND OF THE INVENTION

The present invention generally relates to connectors, and more particularly to a connector comprising a plug which is detachably coupled to a socket.

An apparatus such as a computer is coupled to another apparatus via a cable. Recently, an optical fiber cable is used to couple two apparatuses. An optical plug having a ferrule is provided on a tip end of the conventional optical fiber cable, and this optical plug is inserted into and coupled to a socket provided on the apparatus. When the optical plug is coupled to the socket, tip ends of optical fibers of the optical fiber cable each confront a corresponding light emitting or light receiving element provided in the socket, and the two apparatuses are coupled optically by the optical fiber cable. However, at an optical coupling part where the tip end of each optical fiber and the corresponding light emitting or receiving element confront each other, both the tip end of the optical fiber and the corresponding light emitting or light receiving element must be positioned with a high accuracy. For this reason, it is undesirable for this optical coupling part to be movable, and it is desirable for the optical coupling part to be fixed.

Accordingly, an optical fiber cable has been devised in which the light emitting elements and/or light receiving elements and electronic circuits coupled thereto are provided within the optical plug so that the optical coupling part becomes fixed. In this csse, the optical coupling part becomes fixed although the optical fiber cable is used, and the coupling between the optical plug and the socket becomes an electrical coupling. In other words, contact pins of the optical plug make contact with corresponding contact members of the socket.

As one example of the conventional plug, there is a plug comprising a plurality of contact pins including a contact pin for grounding, and a metal shielding pipe surrounding the contact pins. A socket which is inserted with the plug comprises a grounding contact member for making contact with the contact member for grounding, a plurality of contact members for making contact with the corresponding contact pins other than the contact pin for grounding, and a grounding terminal member for making contact with the shielding pipe. The contact members and the grounding terminal member of the socket are soldered to corresponding wiring patterns on a printed circuit of an apparatus and are fixed on the printed circuit. The grounding contact member and the grounding terminal member are independent members and are soldered to a grounding pattern independently. For this reason, the number of grounding members is large, and there is a problem in that the operation of mounting the grounding members on the socket is troublesome to carry out.

In addition, the contact pins of the conventional plug are arranged so that tip ends thereof lie on the same plane, and the contact members of the conventional socket are similarly arranged so that ends thereof lie on the same plane. Hence, when the plug is inserted into the socket, there is a problem in that the contact pins for signal transmission and reception may make contact with the corresponding contact members before the contact pin for grounding and the contact pins for supplying power make contact with the corresponding contact members depending on the manner in which the plug is inserted into the socket. When the contact pins for signal transmission and reception make contact with the corresponding contact members before the contact pin for grounding and the contact pins for supplying power make contact with the corresponding contact members, signals may not be transmitted normally immediately after the plug is inserted into the socket, and a part of the circuit in the plug and/or the apparatus such as a CMOS type integrated circuit may become damaged.

On the other hand, the plug comprises a generally cylindrical holding member for holding the contact pins, and the holding member is provided within the shielding pipe. However, since the shielding pipe and the holding member are connected together by an adhesive, there is a problem in that the operation of connecting the shielding pipe and the holding member is troublesome to carry out.

Furthermore, in the conventional plug and socket, there is no special means for positioning the plug along a peripheral direction thereof when the plug is inserted into the socket. For this reasin, when inserting the plug into the socket, it is necessary for the operator to position the plug along the peripheral direction thereof and to visually confirm that the contact pins of the plug will make contact with the corresponding contact members of the socket. Thus, there is a problem in that the operation of inserting the plug into the socket is troublesome to carry out.

Moreover, a conventional connector comprising the plug and the socket is provided with no means for informing the operator that the operation of coupling the plug to the socket has been completed. For this reason, the operation of coupling the plug to the socket is carried out by inserting the plug into the socket to a position where the plug can no longer be inserted. However, even when the plug is inserted into the socket up to the position where the plug can no longer be inserted, it is uncertain whether or not the plug has actually been coupled to the socket.

On the other hand, in the case of the optical plug provided on the tip end of the optical fiber cable, the light emitting element is embeddedly provided within a molded synthetic resin support. Hence, only the light emitted from a front of the light emitting element is used as an optical signal by being supplied to the corresponding optical fiber, and there is a problem in that the light emitted from sides of the light emitting element is not effectively used for the signal transmission.

SUMMARY OF THE INVENTION

Accordingly, it is a general object of the present invention to provide a novel and useful connector in which the problems described heretofore are eliminated.

Another and more specific object of the present invention is to provide a connector comprising a plug and a socket, where a contact member for grounding and a grounding terminal member of the socket are constituted by a single member. According to the connector of the present invention, the number of parts of the socket is reduced, and the operation of assembling the socket is simplified.

Still another object of the present invention is to provide a connector comprising a plug and a socket, where contact pins of the plug project for different lengths along a longitudinal direction thereof or contact members of the socket have ends which are mutually deviated along the longitudinal direction so that contact pins of the plug for signal transmission and reception make contact with corresponding contact members of the socket after a contact pin for grounding and contact pins for supplying power make contact with corresponding contact members of the socket when the plug is inserted into the socket. According to the connector of the present invention, it is possible to positively prevent an accident wherein a part of a circuit of the plug and/or an apparatus is damaged due to signals supplied to the plug and/or the apparatus before the contact pin for grounding and the contact pins for supplying power make contact with the corresponding contact members. In addition, the plug can be inserted smoothly into the socket because forces acting in a direction against the insertion of the plug is effectively distributed.

A further object of the present invention is to provide a connector comprising a plug and a socket, where the plug comprises a shielding pipe provided with a cut-and-raised portion extending to the inside of the shielding pipe and a holding member which holds contact pins and is provided with a groove on a peripheral surface thereof, and the holding member is inserted into and fixed to the shielding pipe with the cut-and-raised portion engaged to the groove. According to the connector of the present invention, it is possible to fix the holding member inside the shielding pipe by an extremely simple construction.

Another object of the present invention is to provide a connector comprising a plug and a socket, where a shielding pipe of the plug and a cylindrical part of the socket into the shielding pipe fits are respectively provided with corresponding groove and projection or vice versa, so that the plug is positioned in a peripheral direction thereof with respect to the socket by the engagement of the corresponding groove and projection. According to the connector of the present invention, it is possible to positively prevent an erroneous insertion of the plug into the socket because the plug can be coupled to the socket only when the corresponding groove and projection engage with each other. In addition, even when a rotating force acts on the plug in a state where the plug is coupled to the socket, the rotation of the plug is positively prevented by the engagement of the corresponding groove and projection, and it is therefore possible to prevent an unwanted force from acting on contact pins of the plug.

Still another object of the present invention is to provide a connector comprising a plug and a socket, where the socket is provided with a resilient member which engages the plug when the plug is inserted into a final position in the socket. According to the connector of the present invention, a click sound is generated and the operator receives a slight shock at his finger tips when the plug is inserted into the final position, thereby making it easy to confirm that the coupling of the plug to the socket has been completed.

A further object of the present invention is to provide a connector comprising a plug and a socket, where the plug is provided with a reflecting surface for reflecting and directing light emitted from sides of a light emitting element to a tip end of a corresponding optical fiber confronting the light emitting element. According to the connector of the present invention, it is possible to carry out satisfactory optical signal transmission since the light emitted from the light emitting element is effectively used to a maximum.

Other objects and further features of the present invention will be apparent from the following detailed description when read in conjunction with the accompanying drawings.

BRIEF DESCRIPTION OF THE DRAWINGS

FIGS. 1A and 1B are a side view in cross section and a front view respectively showing an embodiment of a plug which constitutes a connector according to the present invention together with a socket which is inserted with the plug;

FIG. 2 is a front view showing an embodiment of the socket of the connector according to the present invention;

FIGS. 3 through 5 are cross sectional views of the socket along lines III—III, IV—IV and V—V in FIG. 2;

FIG. 6A is a front view showing an embodiment of a support on which a light emitting diode and a photodiode are fixed in the connector according to the present invention;

FIG. 6B is a cross sectional view along a line VI—VI in FIG. 6A;

FIGS. 7A through 7C are a side view, a plan view and a front view respectively showing an embodiment of an optical transmission and reception unit in the connector according to the present invention;

FIG. 8 is a circuit diagram showing an embodiment of the circuit construction of the optical transmission and reception unit;

FIGS. 9A and 9C are a side view and a front view respectively showing an embodiment of a shielding pipe in the connector according to the present invention;

DETAILED DESCRIPTION

Figure 9B:
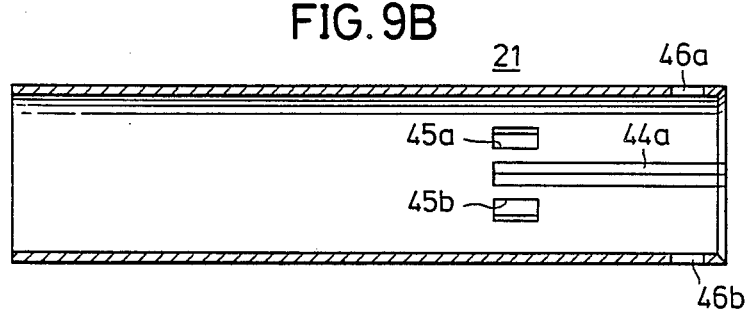
FIG. 9B is s cross sectional view along a line IXB—IXB in FIG. 9A.

Description will be given with respect to an embodiment of the connector according to the present invention. The connector comprises a plug 11 having a construction shown in FIGS. 1A and 1B, and a socket 12 which is inserted with the plug 11 and has a construction shown in FIGS. 2 through 5, 11 and 12.

As shown in FIGS. 1A and 1B, a light emitting diode 13, a photodiode and integrated circuit (hereinafter simply referred to as a photodiode IC) 14 and a circuit assembly 15 for signal processing are asembled within the plug 11. A contact pin 16 for signal reception, a contact pin 17 for grounding, a contact pin 18 for signal transmission, and contact pins 19 and 20 for supplying power are provided on a tip end of the plug 11, and these contact pins 16 through 20 are surrounded by a metal shielding pipe 21. An optical fiber cable 22 having a pair of optical fibers is connected to the other end of the plug 11.

As shown in FIGS. 2 through 5, the socket 12 comprises a main socket body 28 which is made of a synthetic resin. A contact member 23 for signal reception, a contact member 24 for grounding, a contact member 25 for signal transmission, and contact members 26 and 27 for supplying power are assembled within the main socket body 28, and a cover 29 covers a rear of the main socket body 28 so as to hold the contact members 23 through 27 is place. For example, the socket 12 is provided on a rear surface of a computer (not shown) and is coupled to a printed circuit (not shown) of the computer.

Two apparatuses such as computers are coupled to each other by inserting the plug 11 into the socket 12 so as to couple the plug 11 to the socket 12.

The light emitting diode 13 and the photodiode IC 14 are fixed on a support 30 having a generally cylindrical shape, as shown in FIGS. 6A and 6B. The support 30 and a generally cylindrical holding member 31 which holds the contact pins 16 through 20 are fixed on ends of the circuit assembly 15 as shown in FIGS. 7A through 7C. Terminals of the light emitting diode 13 and the photodiode IC 14 are electrically coupled to corresponding terminals of the circuit assembly 15 by soldering as indicated by shaded portions, and the contact pins 16 through 20 and corresponding terminals of the circuit assembly 15 are electrically coupled by soldering. The support 30, the holding member 31 and the circuit assembly 15 constitute an optical transmission and reception unit 32. The circuit assembly 15 comprises a CMOS type integrated circuit (IC) chip 34, transistors 35 and 36, and chip capacitors 37 and 38 which are provided on a substrate 33. The unit 32 has a circuit construction shown in FIG. 8. An optical signal received by the photodiode IC 14 is subjected to a shaping and the like in the photodiode IC 14 and is supplied to an interface circuit 39 wherein the level of the signal is appropriately converted. An output signal of the interface circuit 39 is obtained via the contact pin 16 as an electrical signal. An electrical signal applied to the contact pin 18 is supplied to a driving circuit 40 for driving the light emitting diode 13. An output signal of the driving circuit 40 is supplied to the light emitting diode 13 via a constant current circuit 41, so as to drive the light emitting diode 13.

Figure 9C:
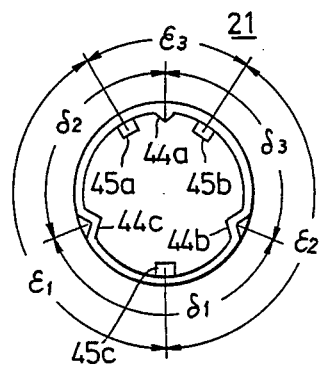

As shown in FIGS. 7A through 7C, grooves 42a, 42b and 42c having a triangular (or V-shaped) cross section and grooves 43a, 43b and 43c having a rectangular cross section are respectively formed with unequal angular intervals on the holding member 31. These grooves 42a through 42c and 43a through 43c extend in an axial direction of the holding member 31. On the other hand, as shown in FIGS. 9A through 9C, projections 44a through 44c having a triangular cross section and respectively corresponding to the grooves 42a through 42c and cut-and-raised portions 45a through 45c bent toward the inside of the shielding pipe 21 and respectively corresponding to the grooves 43a through 43c are respectively formed with unequal angular intervals on the shielding pipe 21. These projections 44a through 44c and 45a through 45c extend in an axial direction of the shielding pipe 21. In FIGS. 7C and 9C, angles $\beta_1$ and $\delta_1$ are respectively equal to 135°, angles $\beta_2$, $\beta_3$, $\delta_2$ and $\delta_3$ are respectively equal to 112.5°, angles $\gamma_1$, $\gamma_2$, $\epsilon_1$ and $\epsilon_2$ are respectively equal to 150°, and angles $\gamma_3$ and $\epsilon_3$ are respectively equal to 60°. Small openings 46a and 46b are formed on right and left sides of the pipe 21 in a vicinity of the tip end of the shielding pipe 21.

Figure 10:
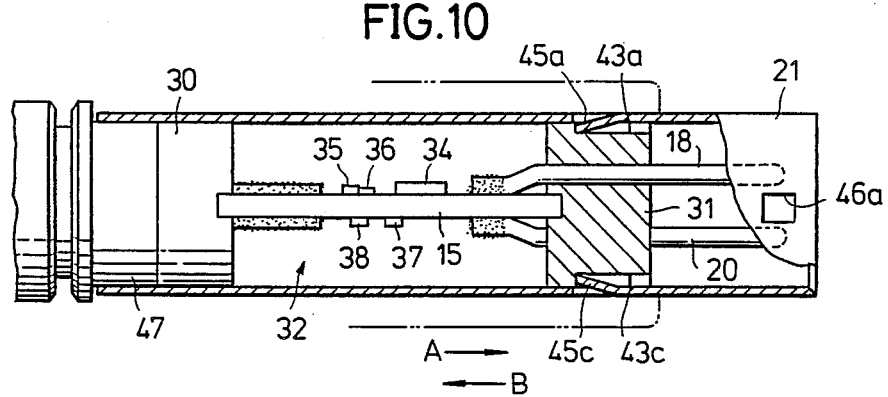
FIG. 10 shows the optical transmission and reception unit fixed inside the shielding pipe.

The grooves 42a through 42c of the holding member 31 fit over the corresponding projections 44a through 44c of the shielding pipe 21, and the holding member 31 is positioned on the peripheral direction and is restricted from rotation. In addition, as shown in FIG. 10, terminal portions of the grooves 43a through 43c of the holding member 31 are engaged and stopped by the corresponding cut-and-raised portions 45a through 45c of the shielding pipe 21, and the holding member 31 is restricted from moving in a direction A. In other words, the unit 32 is provided inside the shielding pipe 21 in a state where the holding member 31 is prevented from slipping out of the shielding pipe 21 in the direction A.

As shown in FIGS. 1 and 10, a tip end of a ferrule 47 is fitted into and fixed to an end of the shielding pipe 21 opposite to the open end thereof. Hence, the unit 32 is fixed within the shielding pipe 21 in a state restricted from rotation and axial movement.

Ends of cable portions 22a and 22b of the optical fiber cable 22 are secured within a holder 48 as shown in FIG. 1. The holder 48 is fitted and secured within the ferrule 47, and exposed optical fibers 49a and 49b of the cable portions 22a and 22b are fixed within the ferrule 47. Tip end surfaces of the optical fibers 49a and 49b confront the light emitting diode 13 and the photodiode IC 14, respectively.

Figure 14:
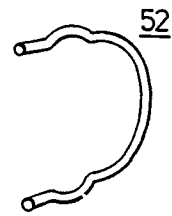
FIG. 14 is a perspective view showing a securing member.

A cable cover 50 covers the optical fiber cable 22 in the vicinity of the end of the plug 11 opposite to the contact pins 16 through 20. A plug holder 51 is secured to the ferrule 47 by a generally U-shaped securing member 52 shown in FIG. 14, and covers the ferrule 47 and the shielding pipe 21.

As shown in FIG. 2, the main socket body 28 comprises a cylindrical part 60 for accommodating contact members and a ring-shaped space 61 provided on the periphery of the cylindrical part 60.

Grooves 62a, 62b and 62c having a triangular (or V-shaped) cross section and corresponding to the projections 44a through 44c of the shielding pipe 21 are formed on the peripheral surface of the cylindrical part 60. The grooves 62a through 62c extend in the axial direction of the cylindrical part 60. In FIG. 2, an angle $\theta_1$ is equal to 135°, and angles $\theta_2$ and $\theta_3$ are respectively equal to 112.5°.

As shown in FIG. 3, the contact member 24 for grounding comprises in addition to a first contact portion 24a which makes contact with the contact pin 17 for grounding a second contact portion 24b which makes contact with the shielding pipe 21. The second contact portion 24b is located on the lower side of the ring-shaped space 61.

In addition, as shown in FIGS. 4 and 5, the contact members 27 and 25 have contact portions 27a and 25a which make contact with the contact pins 20 and 18, respectively. Similarly, the contact members 26 and 23 have contact portions 26a and 23a which make contact with the contact pins 19 and 16, respectively. Each of the contact portions 23a, 25a, 26a and 27a have a forked shape.

Holes 63 through 67 are formed on the front surface of the cylindrical part 60 for receiving the contact pins which make contact with the corresponding ones of the contact portions 23a, 24b, 25a, 26a and 27a.

When inserting the plug 11 into the socket 12, the plug 11 is positioned so that the projections 44a through 44c match the corresponding grooves 62a through 62c and is then inserted in the direction A in FIG. 1. Thus, the shielding pipe 21 enters within the ring-shaped space 61 to spread the second contact portion 24b and make contact therewith as shown in FIG. 3. The contact pin 17 passes through the hole 64 to spread the first contact portion 24a and make contact therewith. As shown in FIG. 4, the contact pins 19 and 20 pass through the respective holes 66 and 67 to spread the respective contact portions 26a and 27a and make contact therewith. Similarly, as shown in FIG. 5, the contact pins 16 and 18 pass through the respective holes 63 and 65 to spread the respective contact portions 23a and 25a and make contact therewith. As a result, the plug 11 becomes electrically coupled to the socket 12.

When the plug 11 is coupled to the socket 12, a first computer (not shown) or the like provided with the socket 12 becomes coupled to a second computer (not shown) or the like from which the optical fiber cable 22 stems. An electrical signal from the first computer is supplied to the driving circuit 40 shown in FIG. 8 via the contact pin 18. An output current of the driving circuit 40 is applied to the light emitting diode 13 via the constant current circuit 41, and the light emitting diode 13 emits light. In other words, the electrical signal is converted into an optical signal. The optical signal (light) from the light emitting diode 13 is transmitted via the optical fiber 49a and is supplied to the second computer. As shown in FIGS. 6A and 6B, the support 30 has a sloping surface 68 which has an inverted conical shape and surrounds the light emitting diode 13. A metal film 69 made of a metal such as Ni, Ag, Cu, Au and Sb is formed on the sloping surface 68 to constitute a mirror surface of the sloping surface 68. A sloping angle α of the sloping surface 68 is set to such an angle that the light emitted from the sides of the light emitting diode 13 is reflected and directed toward the tip end surface of the optical fiber 49a. For this reason, the light emitted from the front of the light emitting diode 13 and also the light emitted from the sides of the light emitting diode 13 and reflected by the sloping surface 68 enter the optical fiber 49a and are used as portions of the optical signal. Hence, the quantity of light emitted from the light emitting diode 13 is effectively used to a maximum as the opticsl signal which is to be transmitted via the optical fiber 49a.

An optical signal from the second computer is transmitted via the optical fiber 49b and is received by the photodiode IC 14 which converts the optical signal into an electrical signal. This electrical signal from the photodiode IC 14 is passed through the interface circuit 39, the contact pin 16 and the contact member 23, and is supplied to the first computer. Since the photodiode IC 14 integrally comprises a photodiode and an integrated circuit for immediately amplifying and subjecting an output converted electrical signal of the photodiode to the necessary processing such as shaping, it is possible to improve the signal-to-noise ratio compared to the case where the photodiode and the integrated circuit are provided as independent parts and noise can easily mix into the signal between the photodiode and the integrated circuit.

In the state where the plug 11 is coupled to the socket 12, the projections 44a through 44c fit into the corresponding grooves 62a through 62c, and the plug 11 is prevented from rotating in the peripheral direction thereof with respect to the socket 12. Accordingly, even when a rotating force is applied on the plug 11, the rotating force is received by the projections 44a through 44c and the corresponding grooves 62a through 62c, and it is possible to prevent the rotating force from acting on the contact pins and the contact members.

In FIGS. 3 through 5, a relation a<b<c stands among a distance a between the front surface of the socket 12 and the first contact portion 24a, a distance b between the front surface of the socket 12 and the contact portion 27a (26a) and a distance c between the front surface of the socket 12 and the contact portion 25a (23a). In addition, the tip ends of the contact pins 16 through 20 lie on the same plane. For this reason, when the plug 11 is inserted into the socket 12, the contact pin 17 for grounding first makes contact with the contact member 24, the contact pins 19 and 20 for supplying power next make contact with the respective contact members 26 and 27, and the contact pins 18 and 16 for signal transmission and reception thereafter make contact with the respective contact members 25 and 23.

When the contact pins 18 and 16 for signal transmission and reception make contact with the respective contact members 25 and 23 before the contact pin 17 for grounding and the contact pins 19 and 20 for supplying power make contact with the respective contact members 24, 26 and 27, the CMOS type IC chip 34 may become damaged. However, since the contact pin 17 for grounding and the contact pins 19 and 20 for supplying power make contact with the respective contact members 24, 26 and 27 before the contact pins 18 and 16 for signal transmission and reception make contact with the respective contact members 25 and 23, the damage to the CMOS type IC chip 34 is positively prevented according to the present embodiment.

It is desirable for the contact pin 17 for grounding to make contact with the contact member 14 before the contact pins 19 and 20 for supplying power make contact with the contact members 26 and 27, but this sequence is not essential and this sequence may be reversed.

A distance d between the first and second contact portions 24a and 24b in FIG. 3 and a distance e between the tip end of the contact pin and the tip end of the shielding pipe 21 in FIG. 1 are set equal to each other. Thus, the contact pin 17 makes contact with the first contact portion 24a simultaneously as when the shielding pipe 21 makes contact with the second contact portion 24b.

When the contact pins make contact and spread the corresponding contact parts, a force acts on the plug 11 against the insertion of the plug 11 into the socket 12. But since the timing with which the contact pins make contact with the corresponding contact portions differ as described before, the force acting on the plug 11 against the insertion thereof is effectively distributed. As a result, it is unnecessary to insert the plug 11 into the socket 12 with a large inserting force, and the insertion of the plug 11 can be carried out smoothly.

Figure 15:
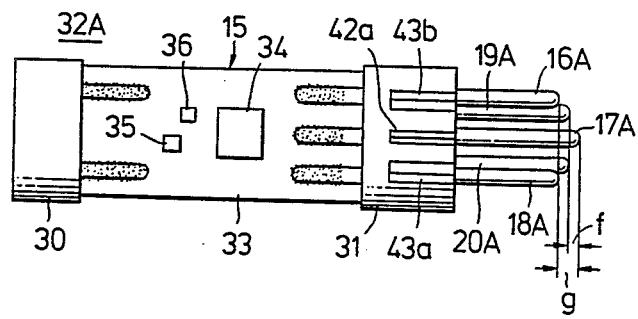
FIG. 15 is a plan view showing an optical transmission and reception unit which constitutes an essential part of a modification of the plug in the connector according to the present invention.

Instead of arranging the contact members 23 through 27 within the socket 12 as described before, it is possible to obtain the same effects by arranging the contact pins 16 through 20 of the plug 11 similarly to the contact members 23 through 27. FIG. 15 shows a modification of the plug which comprises an optical transmission and reception unit 32A. In FIG. 15, those parts which are the same as those corresponding parts in FIG. 7B are designated by the same reference numerals, and description thereof will be omitted. In the unit 32A, a contact pin 17A for grounding projects most from the holding member 31, contact pins 19A and 20A for supplying power have tip ends which are receded by a distance f from the tip end of the contact pin 17A. Contact pins 18A and 16A for signal transmission and reception have tip ends which are receded by a distance g from the tip end of the contact pin 17A. The distance g is greater than the distance f.

A socket which is used with this modification of the plug has the tip ends of the contact portions arranged on the same plane. Hence, when this modification of the plug is inserted into the socket having such an arrangement, the contact pin 17A for grounding first makes contact with the corresponding contact member, the contact pins 19A and 20B for supplying power next make contact with the corresponding contact members, and the contact pins 18A and 16A for signal transmission and reception thereafter make contact with the corresponding contact members. Therefore, it is possible to obtain the same effects as the case described before where the ends of the contact portions 24a through 27a of the socket 12 are mutually deviated in the axial direction thereof.

When considering the productivity, it is more advantageous to make the ends of the contact portions 24a through 27a within the socket 12 mutually deviated in the axial direction as shown in FIGS. 3 and 4 than to make the tip ends of the contact pins 16A through 20A of the plug mutually deviated in the axial direction as shown in FIG. 15. The reason why the socket 12 shown in FIGS. 3 and 4 are more advantageous when the productivity is considered is because the contact members 24 through 27 have different shapes and no problems will be introduced at the time of assembly even when the dimensions of the contact members 24 through 27 are different. In addition, by using the socket 12 having the construction shown in FIGS. 3 through 5, contact pins having the same shape and dimension may be used for the contact pins 16 through 20 and the assembling of the plug 11 can accordingly be facilitated.

Figure 11:
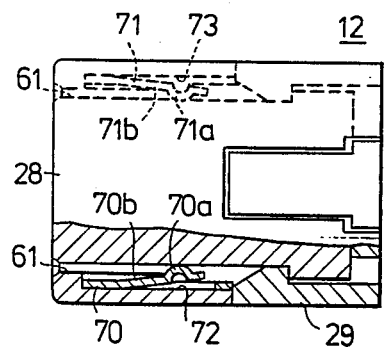
FIGS. 11 and 12 are a plan view with a part shown in cross section and a side view respectively showing the socket.
Figure 12:
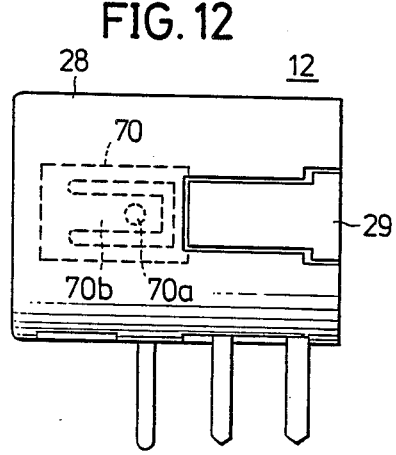

As shown in FIGS. 2, 11 and 12, resilient members 70 and 71 are provided within the socket 12. the resilient members 70 and 71 are pressed from a metal piece, for example. The resilient member 70 comprises a resilient piece 70b formed with a semicircular projection 70a on a tip end thereof, and the resilient member 71 similarly comprises a resilient piece 71b formed with a semicircular projection 71a on a tip end thereof. Grooves 73 and 72 are provided on the inner sides of the right and left side surfaces of the main socket body 28, respectively. The resilient members 70 and 71 are inserted into the respective grooves 72 and 73 from the rear of the main socket body 28 and is prevented from slipping out by the cover 29. The projections 70a and 71a project into the ring-shaped space 61.

Figure 13:
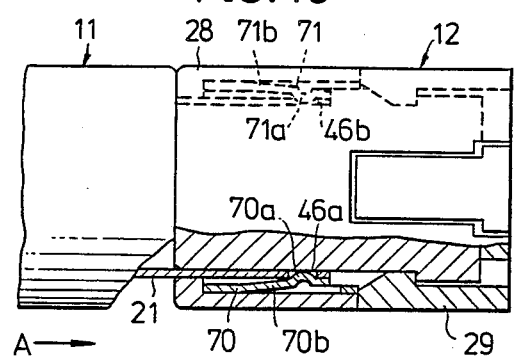
FIG. 13 is a plan view with a part shown in cross section showing the plug coupled to the socket.

As the plug 11 is inserted into the socket 12, the shielding pipe 21 pushes the projections 70a and 71a toward the outside. When the plug 11 is inserted into a final position shown in FIG. 13 where the plug 11 is correctly coupled to the socket 12, the openings 46a and 46b of the shielding pipe 21 confront the respective projections 70a and 71a, and the projections 70a and 71a resiliently fit into the respective openings 46a and 46b. A click sound is generated and the operator receives a slight shock at his finger tips when the projections 70a and 71 fit into the respective openings 46a and 46b. As a result, the operator can positively confirm that the plug 11 has been inserted into the final position and the coupling of the plug 11 to the socket 12 has been completed. The projections 70a and 71a fitted into the openings 46a and 46b also act as stoppers for preventing unwanted disconnection of the plug 11 from the socket 12.

Further, the present invention is not limited to these embodiments, but various variations and modifications may be made without departing from the scope of the present invention.

What is claimed is:

1. A connector comprising:
   a plug having a main plug body, a plurality of contact pins projecting from the main plug body and including a contact pin for grounding, and a tubular shielding member surrounding the plurality of contact pins, a ferrule provided at one open end of said tubular shielding member for fixedly supporting an optical fiber, a support provided within said tubular shielding member for supporting a light emitting element and/or a light receiving element which is arranged to confront a tip end of the optical fiber, a holding member provided at the other open end of said tubular shielding member for holding said plurality of contact pins, and a circuit board assembly which has an elongated shape and is bridged between said support and said holding member along a length of said circuit board assembly to be connected to terminals projecting from said support and to terminals projecting from said holding member, respectively; and
   a socket having a main socket body, a plug receiving part provided on the main socket body for receiving the tubular shielding member, a plurality of contact portions provided within the plug receiving part for making contact with corresponding ones of the plurality of contact pins and including a first contact portion for making contact with the contact pin for grounding, and a second contact portion provided on the main socket body for making contact with the tubular shielding member, said first and second contact portions being made of a single contact member,
   said plug being detachably coupled to said socket by inserting the tubular shielding member into the plug receiving part,
   said plurality of contact pins including the contact pin for grounding, contact pins for supplying power and contact pins for signal transmission and reception, said contact pin for grounding and said contact pins for supplying power projecting along a longitudinal direction thereof from the main plug body for lengths greater tha lengths of said contact pins for signal transmission and reception projecting from the main plug body.

2. A connector comprising:
   a plug having a main plug body, a plurality of contact pins projecting from the main plug body and including a contact pin for grounding, and a tubular shielding member surrounding the plurality of contact pins, a ferrule provided at one open end of said tubular shielding member for fixedly supporting an optical fiber, a support provided within said tubular shielding member for supporting a light emitting element and/or a light receiving element which is arranged to confront a tip end of the optical fiber, a holding member provided at the other open end of said tubular shielding member for holding said plurality of contact pins, and a circuit board assembly which has an elongated shape and is bridged between said support and said holding member along a length of said circuit board assembly to be connected to terminals projecting from said support and to terminals projecting from said holding member, respectively; and a socket having a main socket body, a plug receiving part provided on the main socket body for receiving the tubular shielding member, a plurality of contact portions provided within the plug receiving part for making contact with corresponding ones of the plurality of contact pins and including a first contact portion for making contact with the contact pin for grounding, and a second contact portion provided on the main socket body for making contact with the tubular shielding member, said first and second contact portions being made of a single contact member, said plug being detachably coupled to said socket by inserting the tubular shielding member into the plug receiving part, said plurality of contact pins including the contact pin for grounding, contact pins for supplying power and contact pins for signal transmission and reception, said contact pin for grounding projecting along a longitudinal direction thereof from the main plug body for a length greater than lengths of said contact pins for supplying power projecting from the main plug body, said contact pins for supplying power projecting from the main plug body for the lengths greater than lengths of said contact pins for signal transmission and reception projecting from the main plug body.

3. A connector comprising:

a plug having a main plug body, a plurality of contact pins projecting from the main plug body and including a contact pin for grounding, and a tubular shielding member surrounding the plurality of contact pins, a ferrule provided at one open end of said tubular shielding member for fixedly supporting an optical fiber, a support provided within said tubular shielding member for supporting a light emitting element and/or a light receiving element which is arranged to confront a tip end of the optical fiber, a holding member provided at the other open end of said tubular shielding member for holding said plurality of contact pins, and a circuit board assembly which has an elongated shape and is bridged between said support and said holding member along a length of said circuit board assembly to be connected to terminals projecting from said support and to terminals projecting from said holding member, respectively; and a socket having a main socket body, a plug receiving part provided on the main socket body for receiving the tubular shielding member, a plurality of contact portions provided within the plug receiving part for making contact with corresponding ones of the plurality of contact pins and including a first contact portion for making contact with the contact pin for grounding, and a second contact portion provided on the main socket body for making contact with the tubular shielding member, said first and second contact portions being made of a single contact member, said plug being detachably coupled to said socket by inserting the tubular shielding member into the plug receiving part, said plurality of contact pins including the contact pin for grounding, contact pins for supplying power and contact pins for signal transmission and reception, and said plurality of contact portions including the first contact portion for grounding, contact portions for supplying power and contact portions for signal transmission and reception, said plurality of contact portions having ends which are mutually deviated along a longitudinal direction of the plurality of contact pins which make contact with the plurality of contact portions so that when the plug is inserted into the socket the first contact portion and the contact portions for supplying power respectively make contact with the contact pin for grounding and the contact pins for supplying power before the contact portions for signal transmission and reception make contact with the contact pins for signal transmission and reception.

4. A connector comprising:

a plug having a main plug body, a plurality of contact pins projecting from the main plug body and including a contact pin for grounding, and a tubular shielding member surrounding the plurality of contact pins, a ferrule provided at one open end of said tubular shielding member for fixedly supporting an optical fiber, a support provided within said tubular shielding member for supporting a light emitting element and/or a light receiving element which is arranged to confront a tip end of the optical fiber, a holding member provided at the other open end of said tubular shielding member for holding said plurality of contact pins, and a circuit board assembly which has an elongated shape and is bridged between said support and said holding member along a length of said circuit board assembly to be connected to terminals projecting from said support and to terminals projecting from said holding member, respectively; and a socket having a main socket body, a plug receiving part provided on the main socket body for receiving the tubular shielding member, a plurality of contact portions provided within the plug receiving part for making contact with corresponding ones of the plurality of contact pins and including a first contact portion for making contact with the contact pin for grounding, and a second contact portion provided on the main socket body for making contact with the tubular shielding member, said first and second contact portions being made of a single contact member, said plug being detachably coupled to said socket by inserting the tubular shielding member into the plug receiving part, said plurality of contact pins including the contact pin for grounding, contact pins for supplying power and contact pins for signal transmission and reception, and said plurality of contact portions including the first contact portion for grounding, contact portions for supplying power and contact portions for signal transmission and reception, said plurality of contact portions having ends which are mutually deviated along a longitudinal direction of the plurality of contact pins which make contact with the plurality of contact portions so that when the plug is inserted into the socket the first contact portion first makes contact with the contact pin for grounding, the contact portions for supplying power then make contact with the contact pins for supplying power and the contact portions for signal transmission and reception thereafter make contact with the contact pins for signal transmission and reception.

5. A connector comprising:

a plug having a main plug body, a plurality of contact pins projecting from the main plug body and including a contact pin for grounding, and a tubular shielding member surrounding the plurality of contact pins, said tubular shielding member having at least one cut-and-raised portion projecting toward the inside thereof and being formed with at least one opening and at least one projection which has a triangular cross section to project toward the inside thereof and extends in an axial direction thereof, a ferrule provided at one open end of said tubular shielding member for fixedly supporting an optical fiber, a support provided within said tubular shielding member for supporting at least one light emitting element which is arranged to confront a tip end of the optical fiber, said support has a flat reflecting surface for reflecting and directing light emitted from sides of the light emitting element to the tip end of the optical fiber, a holding member provided at the other open end of said tubular shielding member for holding said plurality of contact pins, said holding member being of a generally cylindrical shape and having at least one groove which is formed on a peripheral surface thereof and extends in an axial direction thereof from a tip end thereof, said holding member being fixed to said main plug body by mounting said holding member on said tubular shielding member with the cut-and-raised portion engaged to an end of the groove, and a circuit board assembly which has an elongated shape and is bridged between said support and said holding member along a length of said circuit board assembly to be connected to terminals projecting from said support and to terminals projecting from said holding member, respectively; and a socket having a main socket body, a plug receiving part provided on the main socket body for receiving the tubular shielding member, said plug receiving part having a generally cylindrical shape and being formed with at least one groove which is formed on a peripheral surface therreof to have a V-shaped cross section and extends in an axial direction thereof, a plurality of contact portions provided within the plug receiving part for making contact with corresponding ones of the plurality of contact pins and including a first contact portion for making contact with the contact pin for grounding, and a second contact portion provided on the main socket body for making contact with the tubular shielding member, said first and second contact portions being made of a single contact member, said plug being detachably coupled to said socket by inserting the tubular shielding member into the plug receiving part, said projection of the tubular shielding member and said groove of the plug receiving part engaging and guiding each other when said plug is inserted into said socket, said main socket body of the socket being provided with at least one resilient member for resiliently engaging said opening of said tubular shielding member with a click sound when the plug is inserted into a final position within the plug receiving part, said resilient member being formed from a flat plate to have a projection on a tip end thereof and being inserted into one of grooves provided on inner sides of the right and left side surfaces of the main socket body so that the projection of said resilient member projects into the plug receiving part.

* * * * *